(12) United States Patent
Voldman

(10) Patent No.: US 6,552,879 B2
(45) Date of Patent: Apr. 22, 2003

(54) VARIABLE VOLTAGE THRESHOLD ESD PROTECTION

(75) Inventor: Steven Howard Voldman, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 09/768,631

(22) Filed: Jan. 23, 2001

(65) Prior Publication Data

US 2002/0097532 A1 Jul. 25, 2002

(51) Int. Cl.⁷ ............................................... G11B 5/139
(52) U.S. Cl. ...................................................... 360/323
(58) Field of Search ............................... 360/323, 128; 324/249, 252, 207.21; 365/8, 157–158; 338/32 R, 32 H

(56) References Cited

U.S. PATENT DOCUMENTS

| | | | |
|---|---|---|---|
| 4,384,300 A | 5/1983 | Iizuka | |
| 5,545,572 A | 8/1996 | Lee et al. | |
| 5,587,857 A | 12/1996 | Voldman et al. | |
| 5,771,571 A | 6/1998 | Voldman et al. | |
| 5,808,346 A | 9/1998 | Ueda | |
| 5,811,857 A | 9/1998 | Assaderaghi | |
| 5,903,415 A | * 5/1999 | Gill | ........................... 360/323 |
| 5,946,573 A | 8/1999 | Hsu | |
| 6,015,993 A | 1/2000 | Voldman et al. | |
| 6,040,610 A | 3/2000 | Noguchi et al. | |
| 6,049,110 A | 4/2000 | Koh | |
| 6,118,155 A | 9/2000 | Voldman et al. | |
| 6,157,530 A | 12/2000 | Pequignot et al. | |
| 6,359,750 B1 | * 3/2002 | Hughbanks et al. | ........ 360/128 |

* cited by examiner

Primary Examiner—George J. Letscher
(74) Attorney, Agent, or Firm—G. Marlin Knight

(57) ABSTRACT

An ESD protective circuit is described which has a very low, variable turn-on threshold by using a shunting MOSFET which has an isolated substrate/body which is connected to an electrode that is provided in addition to the gate, source and drain electrodes. A variable gate voltage which is preferably a function of an ESD voltage is used to trigger the MOSFET into conduction. A voltage is applied to the substrate/body of the MOSFET to lower the turn-on voltage. The voltage on the substrate allows the turn-on voltage to be adjusted for different applications and/or to be adjusted dynamically to respond to events. The substrate voltage is also preferably derived from the ESD voltage. Preferably the MOSFET has an epitaxial region with an electrode and a subcollector with an electrode. The epitaxial region electrode can be connected to the gate to improve the turn-on performance. The subcollector electrode can be connected to the substrate/body electrode to contribute to lowering the turn-on voltage. A preferred embodiment uses an ESD protective device according to the invention to protect a magnetic transducer in a data storage system.

26 Claims, 6 Drawing Sheets

VARIABLE VOLTAGE THRESHOLD ESD PROTECTION

FIELD OF THE INVENTION

The invention relates to devices for ESD protection of sensitive thin film components and, more particularly, to ESD protection devices for thin film magnetic transducers.

BACKGROUND OF THE INVENTION

For ESD applications in general, the ESD protection schemes need a fixed voltage threshold and a current sink capacity appropriate to the application. Conventional ESD protection has typically used diodes and diode-like circuits. One important limitation of diode based implementations is the minimum turn-on voltage. As thin film magnetic transducers (heads) are made smaller and more sensitive, their susceptibility to ESD damage has increased and the voltage at which damage may occur has continued to fall. For example, the family of heads using magnetoresistive sensors early in their development had a failure voltage of approximately 2 volts. That number has dropped below 1 volt and can reasonably be expected to continue to fall. For magnetic heads and other similar thin film devices, the turn-on voltage limitation of diodes poses a significant problem for low voltage ESD protection. Although fixed voltage devices may be adequate for many applications, a more flexible solution would have a variable threshold.

The prior art has typically taught straightforward protection schemes for magnetic transducers. For example, U.S. Pat. No. 5,903,415 to Gill describes the use of an asymmetric diode network in parallel with a spin valve sensor in a magnetic transducer. To provide for a lower voltage threshold in one direction, he suggests using a single diode while using two diodes in series in the other direction. U.S. Pat. No. 5,587,857 to Voldman, et al., describes the use of diodes or FETs for ESD protection of magnetic transducers. In particular, Voldman describes the use of a parallel connected pair of FETs which have their gates shorted to opposite end nodes of the pair.

In applications other than ESD protection, it is known in the art that the threshold voltage of various transistor types, particularly MOSFETs, is affected by the voltage level of the substrate or body. This is variously called the "body effect" or "substrate bias effect." Typically the body effect is considered undesirably and efforts are made to negate it, but there have cases where the effect was used to achieve a desired result. For example, in U.S. Pat. No. 6,040,610 to Noguchi, et al., the body effect is used to lower the turn-on voltage when the power supply voltage drops. Noguchi, et al., describe the use of a bias voltage generator connected to a "body electrode" to lower the turn-on voltage when needed. Similarly, U.S. Pat. No. 4,384,300 to Iizuka uses the effect to implement a negative resistance device.

SUMMARY OF THE INVENTION

The invention provides an ESD protective circuit with low capacitance and a very low, variable turn-on threshold by using a shunting MOSFET which has an isolated substrate/body which is connected to an electrode that is provided in addition to the typical gate, source and drain electrodes. A gate voltage which is preferably a function of an ESD voltage is used to trigger the MOSFET into conduction. Preferably a variable voltage is applied to the substrate/body of the MOSFET to lower the turn-on voltage when an ESD event occurs. The variable voltage on the substrate/body allows the turn-on voltage to be adjusted for different applications and/or to be adjusted dynamically to respond to events. The substrate/body voltage is also preferably derived from the ESD voltage.

The source and drain of the MOSFET are connected across the leads of the magnetic sensor element to be protected, i.e., in parallel with the sensor. Since the MOSFET can turn-on with a negative or positive voltage, the selection of appropriate gate and substrate/body control circuits will provide protection for positive and negative ESD events. When operating in the standby state, the voltages are set to achieve low capacitance, low current flow and prevent unwanted turn-on.

In a preferred embodiment the MOSFET additionally has an isolated epitaxial region and a subcollector with separate electrodes. The epitaxial electrode is shorted to the gate electrode. During an ESD event a high voltage on the epitaxial electrode lowers the turn-on threshold through a "reverse body effect." The subcollector electrode can be shorted to the substrate/body electrode to enhance the turn-on threshold lowering effect.

DETAILED DESCRIPTION OF THE INVENTION AND THE PREFERRED EMBODIMENTS

Figure 1:
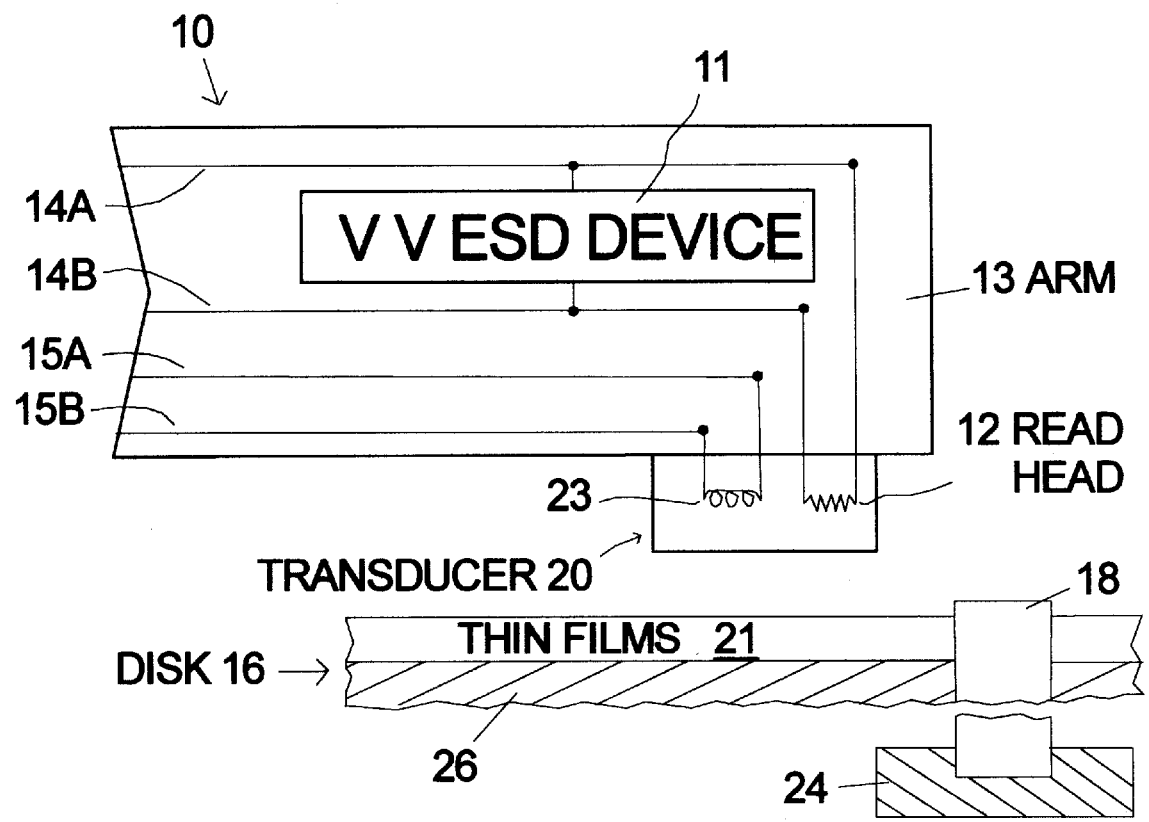
FIG. 1 illustrates a disk drive system with a variable voltage ESD protection device according to the invention.

A disk system 10 with a variable voltage ESD protection device (VVESD) 11 is illustrated in symbolic form in FIG. 1. In operation the magnetic transducer 20 is supported by an arm 13 as it flies above the disk 16. The magnetic transducer 20, usually called a "head," is composed of elements that perform the task of writing magnetic transitions (the write head 23) and reading the magnetic transitions (the read head 12). The electrical signals to and from the read head 12 travel along conductive paths (leads) 14A, 14B which are attached to or embedded in the arm 13. The VVESD 11 is shown in a preferred embodiment as connected across the leads 14A, 14B of the read head 12. The electrical signals to and from the write head 23 travel along conductive paths (leads) 15A, 15B which are attached to or embedded in the arm 13. In an alternative embodiment a VVESD 11 could be used to protect the write head 23 in the same way as is shown for the read head 12. All of the leads 14A, 14B, 15A, 15B are connected to the arm electronics (not shown). The disk 16 is attached to spindle 18 that is driven by spindle motor 24 to rotate the disk 16. The disk 16 comprises a substrate 26 on which a plurality of thin films 21 are deposited. The thin films 21 include ferromagnetic material that is used to record the magnetic transitions in which information is encoded. A tape based storage system (not shown) uses a magnetic transducer in essentially the same way as a disk drive, with the moving tape being used in place of the disk.

The signal across the read head 12 on leads 14A, 14B is a small AC voltage on a DC bias voltage of about 0–3 v which is supplied by the arm electronics (not shown).

Figure 2:
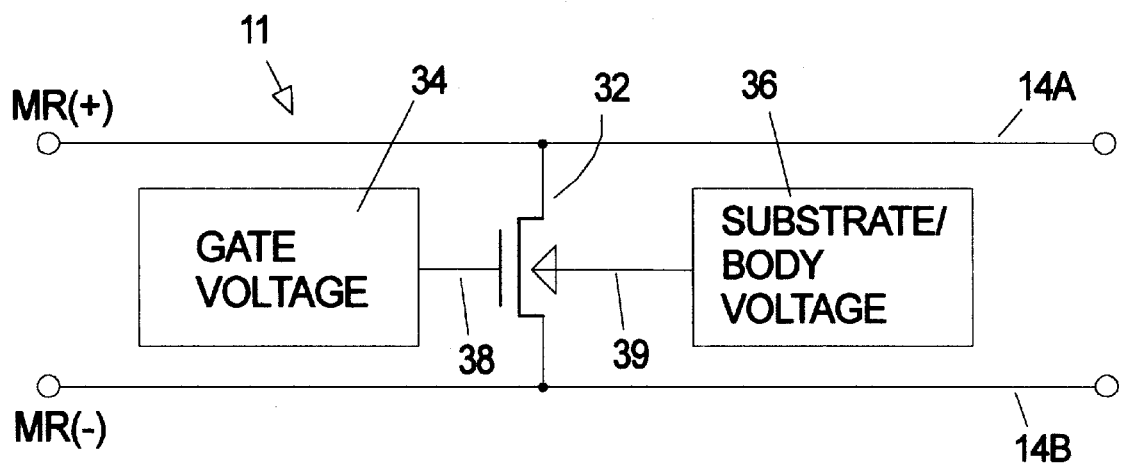
FIG. 2 is a block diagram illustrating the major components of a variable voltage ESD protection device according to the invention.

FIG. 2 is block diagram of a VVESD 11 illustrating the major components and their interconnections. The source and drain of the N-channel MOSFET 32 are connected across the leads 14A, 14B. The gate electrode 38 is connected to a gate voltage source 34. The substrate/body voltage source 36 is connected to the substrate/body electrode 39. When operating in the standby state, the gate voltage is set relatively low to achieve low capacitance, low current flow and prevent unwanted turn-on. During an ESD event the gate voltage is pulled relatively high if the gate is being used as a trigger for turn-on. The substrate/body voltage source 36 is relatively high during an ESD event which lowers the turn-on voltage through the reverse body effect. The gate voltage source 34 can be implemented using an RC circuit, a voltage divider network, a level shift network, logic circuits, resistors, diodes, MOSFETs, MR resistors and combinations thereof. The gate voltage can be chosen as a bias voltage, but it is preferably used to trigger the MOSFET into conduction. Likewise the substrate/body voltage source 36 can be used to bias the substrate voltage, but it is preferably a function of the ESD voltage. Increasing the substrate/body voltage increases conduction by lowering the turn-on threshold of the MOSFET 32 through the reverse body effect.

Figure 9:
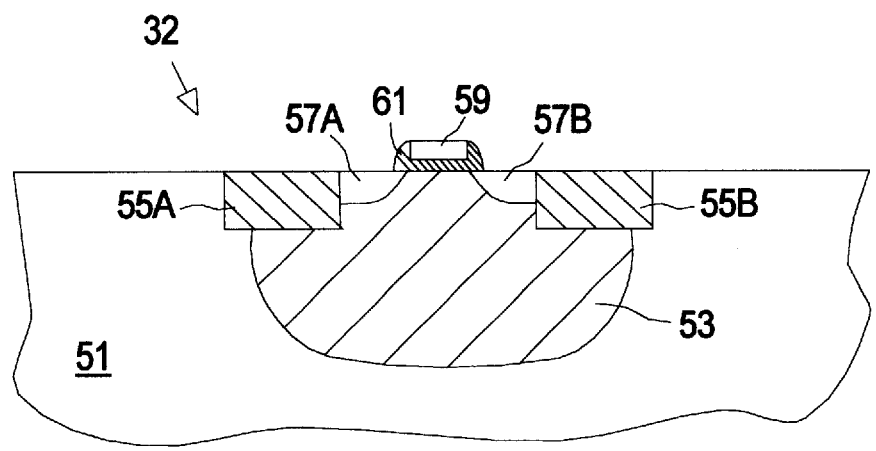
FIG. 9 is an illustration of section of a prior art MOSFET suitable for use in the circuits according to the invention.

A MOSFET 32 with the features required for the VVESD 11 of the invention to function properly can be made by any one of several methods known to those of skill in the semiconductor fabrication arts. The details of these methods are beyond the scope of the present invention. However, for greater understanding of the functioning of the VVESD 11 of the invention, FIG. 9 illustrates a section of one suitable type of prior art MOSFET 32 which is made with an isolated P-well 53 in an N⁻ substrate 51. The P-well 53 is connected to the substrate/body electrode (not shown). The gate 59, gate isolation 61, source/drain regions 57A, 57B are standard. The shallow trench isolation structures 55A, 55B abut the source/drain regions 57A, 57B.

Figure 10:
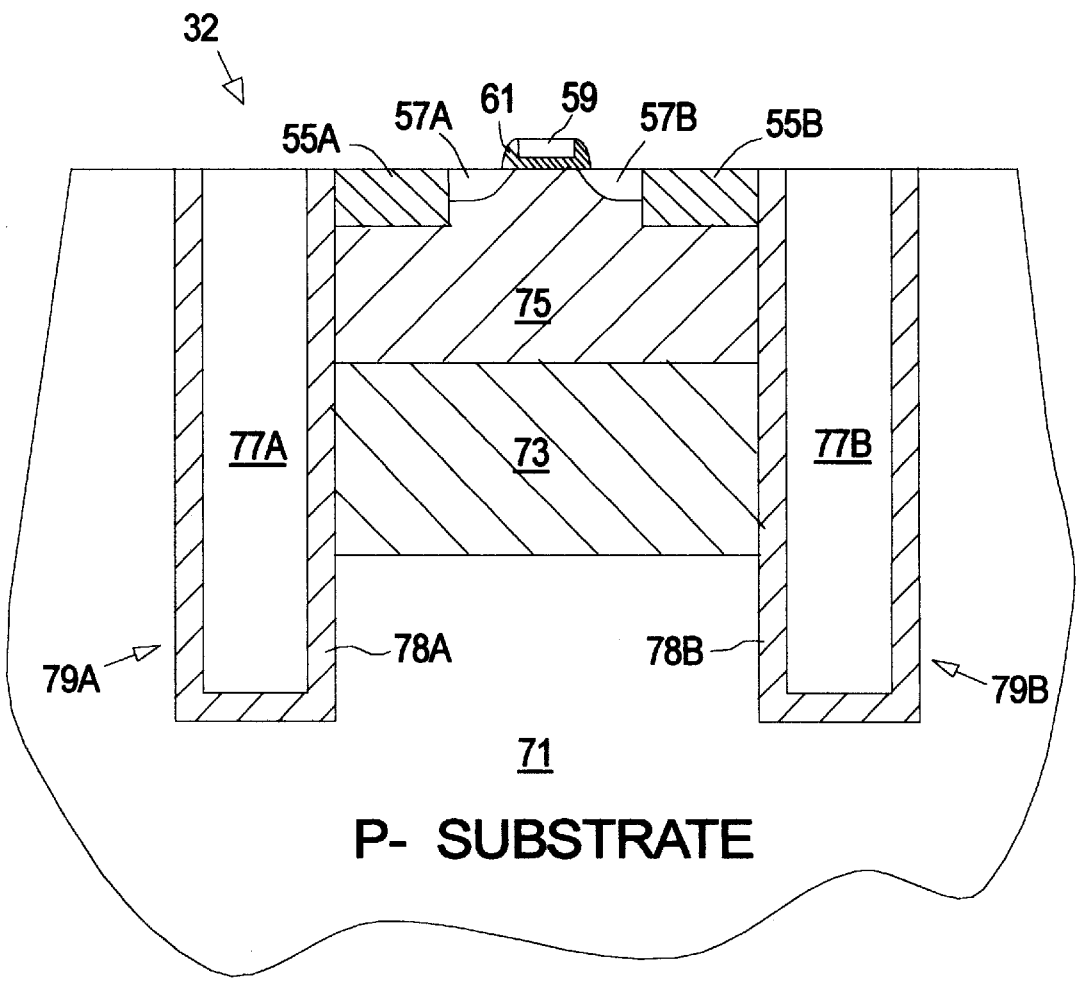
FIG. 10 is an illustration of section of a prior art MOSFET with an epitaxial region and a subcollector suitable for use in the circuits according to the invention.

FIG. 10 illustrates a section of a preferred second type of prior art MOSFET 32 which has an isolated P⁻ epitaxial region 75 which is defined by an N+ subcollector 73 and deep isolation trenches 79A, 79B which extend below the subcollector region 73. The deep isolation trenches 79A, 79B have an outer insulating shell 78A, 78B and an inner polysilicon fill 77A, 77B. The substrate 71 in this design is the connection point for the substrate/body electrode. Additional electrodes are formed for the subcollector 73 and the epitaxial region 75. None of the electrodes are shown, but they are implementable in a straightforward manner by those of skill in the art. Since the subcollector 73 and the epitaxial region 75 will have separate electrodes, the voltage levels can be controlled independently from either the gate or substrate/body electrodes. For some applications it might be desirable to put a bias voltage on one or both of these electrodes to achieve a specific turn-on characteristic. In the embodiments described herein the epitaxial region electrode will be shorted to the gate electrode and the subcollector electrode will be shorted to the substrate/body electrode. A high voltage on the epitaxial electrode lowers the turn-on threshold through a "reverse body effect." Therefore, tying the epitaxial electrode to the gate electrode will enhance the triggering of conduction. Likewise shorting the subcollector electrode to the substrate/body electrode enhances, the turn-on threshold lowering due to the reverse body effect.

With the exception of the RC circuit, the various gate voltage circuits 34 and substrate voltage circuits 36 described below are interchangeable. Thus, any of the substrate voltage circuits 36 can be used with any of the gate voltage circuits 34 and so forth.

Figure 3:
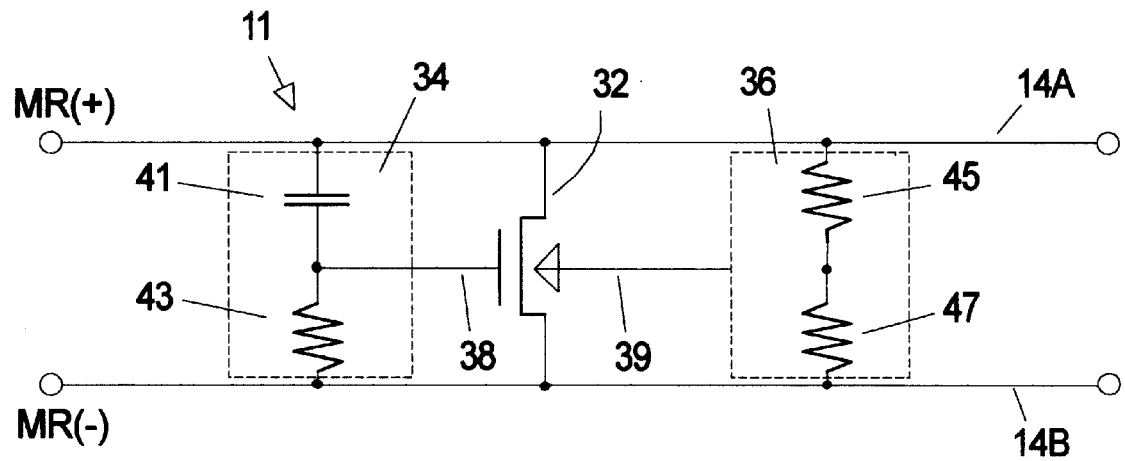
FIG. 3 is a circuit diagram of a first embodiment of a variable voltage ESD protection device according to the invention.

FIG. 3 is a circuit diagram of a first embodiment according to the invention. In this embodiment the gate voltage source 34 is implemented as a series RC circuit. This triggers the gate 38 when a positive ESD event occurs on the leads 14A, 14B. The RC circuit is implemented using capacitor 41 in series with resistor 43. Capacitor 41 is connected to lead 14A. Resistor 43 is connected to lead 14B. The gate 38 connects between capacitor 41 and resistor 43.

The variable substrate/body voltage source 36 in this embodiment is a voltage divider circuit consisting of resistors 45 and 47 which are connected across the leads 14A, 14B. Unlike the RC circuit, this voltage divider is symmetric. Resistors 45, 47 may be conventional resistors, but alternatively MR resistors can be used to more closely track the changes in the MR sensor due to the operating environment. Optionally the MR resistors can be fabricated on the substrate with the MR sensor. This would increase the tracking accuracy and in addition would control to some extent for variations in the MR elements due to the manufacturing process. The relative values of the resistors 45, 47 determine the standby voltage.

Figure 4:
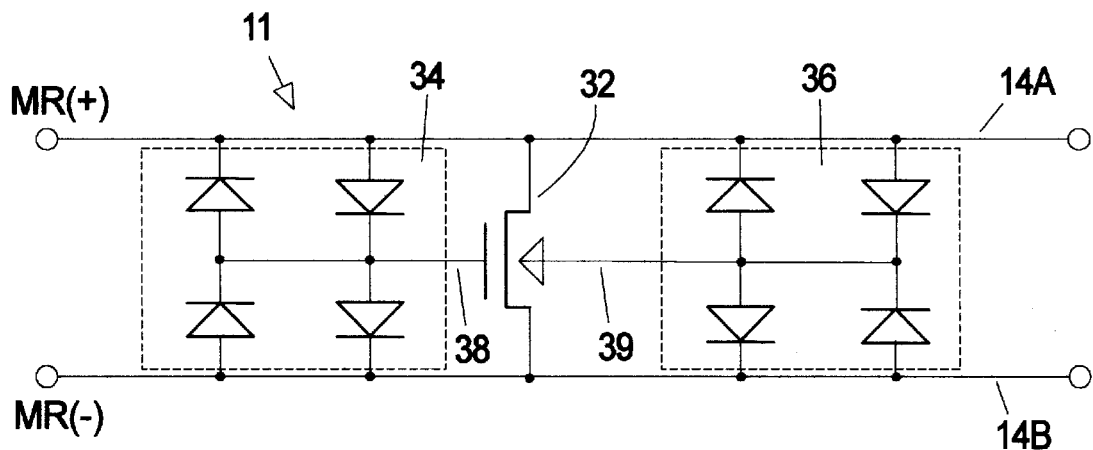
FIG. 4 is a circuit diagram of a second embodiment of a variable voltage ESD protection device according to the invention.

FIG. 4 is a circuit diagram of a second embodiment according to the invention. In this embodiment the gate voltage source 34 and substrate/body voltage source 36 are each, implemented using four diodes connected in a symmetric voltage dividing array with two diodes oriented to conduct in one direction and the other two diodes arranged to conduct in the reverse direction. The gate 38 connects to a node between each pair of diodes in the gate circuit 34. This type of array presents a high resistance to the leads 14A, 14B for up to two times the junction voltage for the diodes, for example, 2*0.6 for 1.2 volts for standard diodes. Above this turn-on voltage for the array, the resistance becomes low which adds to the over-voltage protection. The voltage on the, gate 38 in this implementation is equal to the voltage on the substrate/body.

Figure 5:
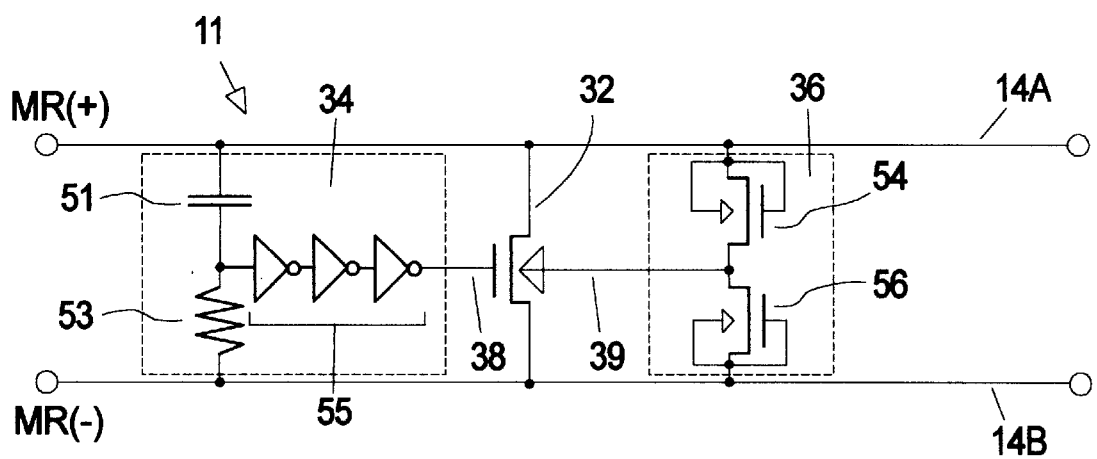
FIG. 5 is a circuit diagram of a third embodiment of a variable voltage ESD protection device according to the invention.

FIG. 5 is a circuit diagram of a third embodiment according to the invention. In this embodiment the gate voltage source 34 is implemented using capacitor 51 in series with resistor 53 to form an RC circuit which is then connected to the gate 38 through three inverters 55 in series. The substrate/body voltage source 36 is implemented as a series connected pair of MOSFETs 54, 56 which are similar to MOSFET 32, but have their gates shorted to their substrate and subcollector electrodes and to the lead 14A or 14B to which they are connected. This configuration is called a diode dynamic threshold MOSFET (DTMOS).

Figure 6:
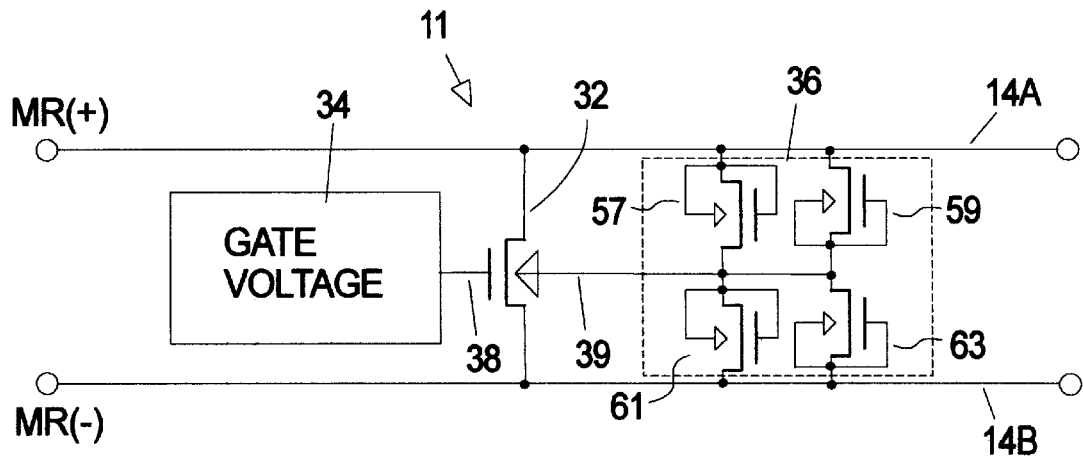
FIG. 6 is a circuit diagram of a fourth embodiment of a variable voltage ESD protection device according to the invention.

FIG. 6 is a circuit diagram of a fourth embodiment according to the invention. In this embodiment the gate voltage source 34 may be any of the implementations described above. The substrate/body voltage source 36 is implemented as symmetric network of four MOSFETs 57, 59, 61, 63 which are similar to MOSFET 32 and have at least a substrate/body electrode and optionally can have the epitaxial region and subcollector electrodes.

Figure 7:
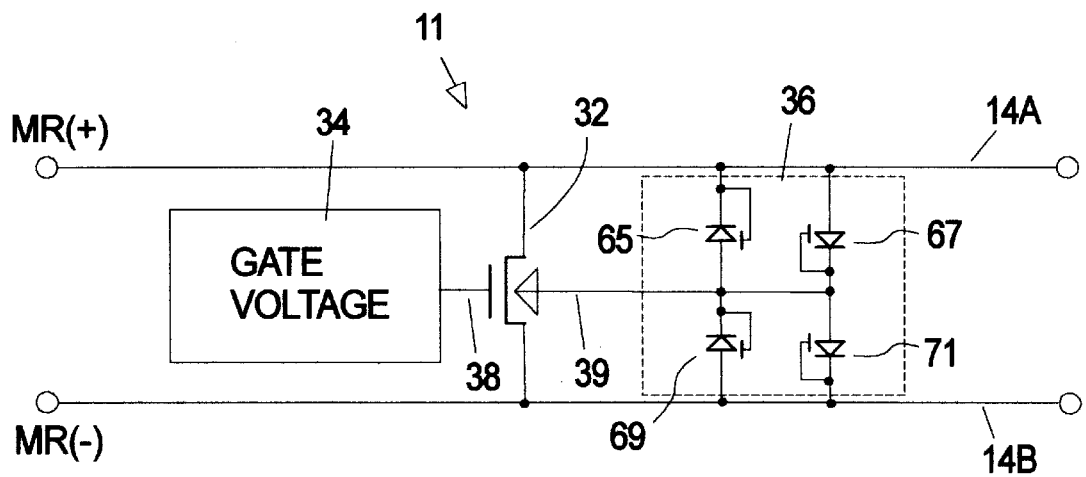
FIG. 7 is a circuit diagram of a fifth embodiment of a variable voltage ESD protection device according to the invention.

FIG. 7 is a circuit diagram of a fifth embodiment according to the invention. In this embodiment the gate voltage source 34 may be any of the implementations described above. The substrate/body voltage source 36 is implemented as four polysilicon gate gated diodes 65, 67, 69, 71 in a symmetric network with each of the diodes having its gate shorted to its anode.

Figure 8:
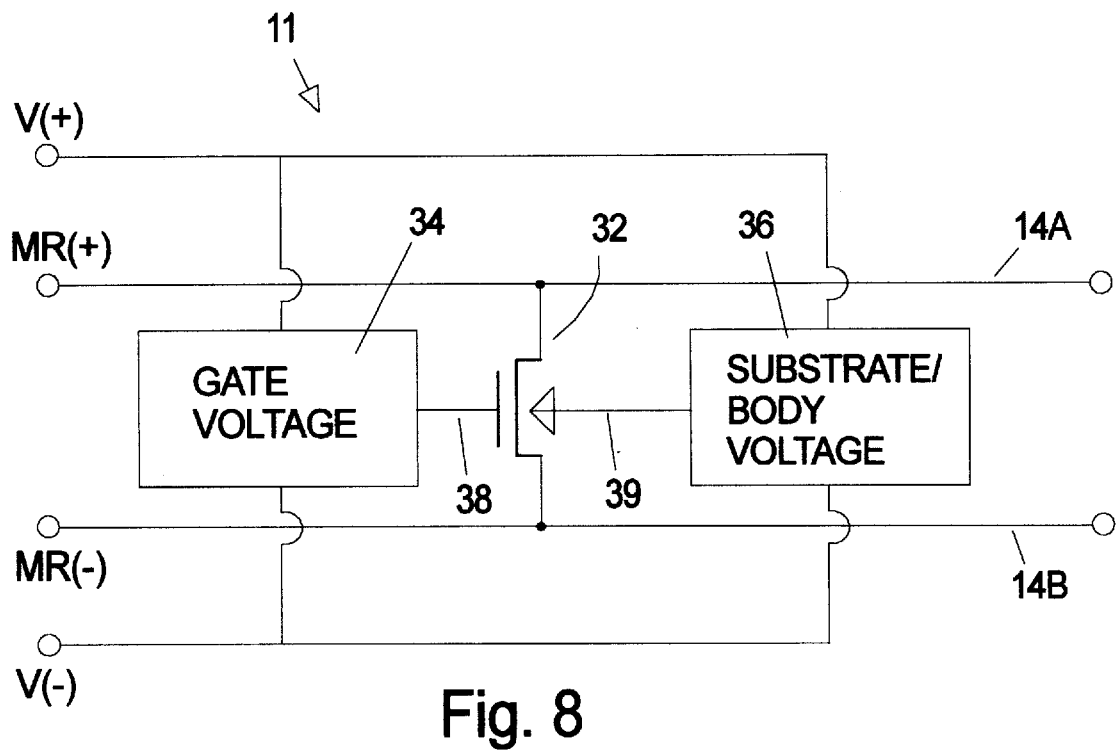
FIG. 8 is a circuit diagram of a sixth embodiment of a variable voltage ESD protection device according to the invention.

FIG. 8 is a circuit diagram of a sixth general embodiment according to the invention. The previous embodiments have all derived the gate trigger and substrate/body voltages from the MR leads 14A, 14B. However, these voltages can also be derived from other signals available in the drive such as might be provided by the arm electronics for example. In FIG. 8 both the gate voltage source 34 the substrate/body voltage source 36 are shown decoupled from the MR leads 14A, 14B. It is also possible to decouple only one of the control circuits while implementing the other along the lines of the embodiments described above.

The invention has been described with respect to specific embodiments, but other equivalent embodiments within the scope and teachings of the invention will be apparent to those of skill in the art.

What is claimed is:

1. An apparatus comprising:
   a magnetic transducer having at least first and second leads; and
   an ESD protection device including:
      a transistor with gate, source and drain electrodes and a substrate/body electrode, the drain being connected to the first lead and the source being connected to the second lead;
      a gate voltage circuit which applies a first voltage to the gate electrode to trigger the transistor into conduction when an ESD voltage appears across the first and second leads; and
      a substrate/body voltage circuit which applies a second voltage to the substrate/body electrode to lower a turn-on voltage of the transistor.

2. The apparatus of claim 1 wherein the transistor has an epitaxial region electrode which is connected to the gate electrode.

3. The apparatus of claim 2 wherein the transistor has a subcollector electrode which is connected to the substrate/body electrode.

4. The apparatus of claim 3 wherein the gate voltage circuit comprises a voltage divider circuit connected to the source and drain electrodes.

5. The apparatus of claim 3 wherein the substrate/body voltage circuit comprises a voltage divider circuit connected to the source and drain electrodes.

6. The apparatus of claim 3 wherein the substrate/body voltage circuit comprises two or more series connected MOSFETs each with an isolated substrate/body and a substrate/body electrode.

7. The apparatus of claim 3 wherein the substrate/body voltage circuit comprises a symmetric network of gated diodes.

8. The apparatus of claim 1 wherein the gate voltage circuit comprises a symmetric diode network connected to the source and drain electrodes.

9. The apparatus of claim 1 wherein the gate voltage circuit further comprises a series RC circuit connected to the source and drain electrodes and coupled to the gate electrode through one or more level shifting devices.

10. A method of protecting a magnetic transducer from ESD damage, the magnetic transducer having first and second leads connected to a source and drain of a MOSFET respectively, the MOSFET having an isolated substrate/body and a substrate/body electrode, the method further comprising the steps of:
   applying a first voltage on a gate electrode of the MOSFET, the first voltage being derived from a voltage between first and second leads; and
   lowering a turn-on threshold of the MOSFET during an ESD event by applying a second voltage on the substrate/body electrode of the MOSFET, the second voltage being derived from the voltage between first and second leads.

11. The method of claim 10 further comprising the step of applying the second voltage to a subcollector electrode of the MOSFET.

12. The method of claim 11 further comprising the step of applying the first voltage to an epitaxial region electrode of the MOSFET.

13. The method of claim 12 wherein the step of applying a first voltage further comprises obtaining the first voltage from a circuit comprising a symmetric network of diodes connected to the source and drain electrodes.

14. The method of claim 12 wherein the step of applying a first voltage further comprises obtaining the first voltage as an output of one or more inverters connected to a series RC circuit connected to the first and second leads.

15. The method of claim 12 wherein the step of applying a first voltage further comprises obtaining the first voltage from a voltage divider circuit connected to the first and second leads.

16. The method of claim 12 wherein the step of applying a second voltage further comprises obtaining the second voltage from a voltage divider circuit connected to the first and second leads.

17. The method of claim 12 wherein the step of applying a second voltage further comprises obtaining the second voltage from a symmetric network of diodes connected to the first and second leads.

18. The method of claim 12 wherein the step of applying a second voltage further comprises obtaining the second voltage from a symmetric network of two or more MOSFETs each with an isolated substrate/body and a substrate/body electrode.

19. A magnetic storage device comprising:
   a magnetic transducer having at least first and second leads;
   an ESD protection device connected across the leads comprising:
      a transistor with gate, source and drain electrodes and a substrate/body electrode which is connected to an isolated substrate/body of the transistor, the drain being connected to the first lead and the source being connected to the second lead;

a gate voltage circuit which applies a first voltage to the gate electrode, the first voltage being a function of a voltage across the source and drain to trigger the transistor when an ESD voltage appears across the source and drain electrodes;

a substrate/body voltage circuit which applies a second voltage to the substrate/body electrode, the second voltage being a function of the voltage across the source and drain electrodes to lower a turn-on voltage of the transistor when an ESD voltage appears across the source and drain electrodes.

20. The device of claim 19 wherein the transistor has an epitaxial region electrode connected to the gate voltage circuit.

21. The device of claim 20 wherein the transistor has a subcollector electrode connected to the substrate/body voltage circuit.

22. The device of claim 21 wherein the gate voltage circuit comprises a voltage divider circuit connected to the first and second leads.

23. The device of claim 21 wherein the substrate/body voltage circuit comprises a voltage divider circuit connected to the first and second leads.

24. The device of claim 21 wherein the substrate/body voltage circuit comprises a symmetric network of diodes connected to the first and second leads.

25. The device of claim 21 wherein the substrate/body voltage circuit comprises a symmetric network of two or more MOSFETs each with an isolated substrate/body and a substrate/body electrode.

26. The device of claim 20 wherein the substrate/body voltage circuit comprises an MR resistor.

* * * * *